Oct. 6, 1964 A. O. JANSSON 3,151,716
MOLDING FASTENER
Filed Feb. 5, 1962
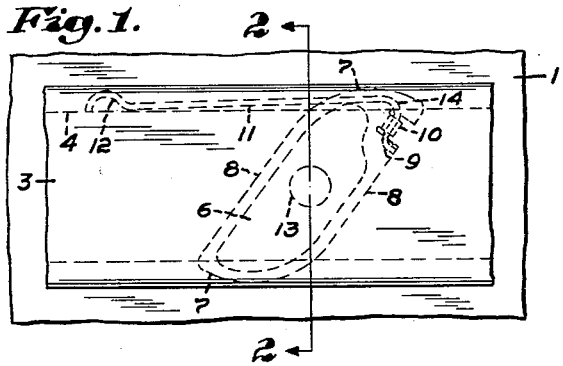
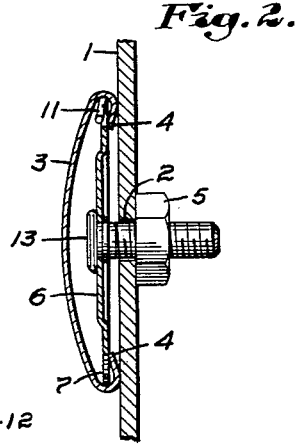
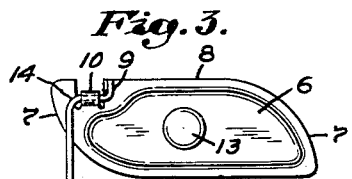
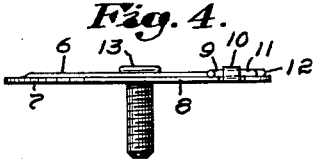
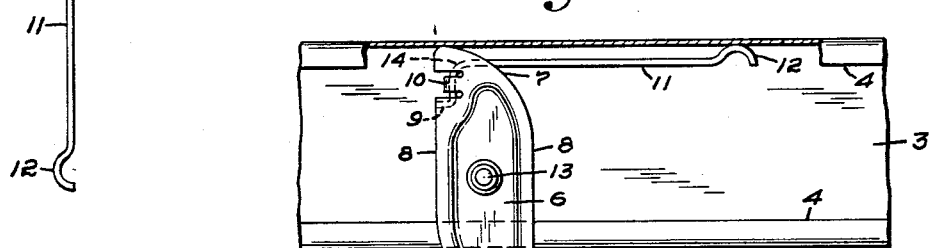
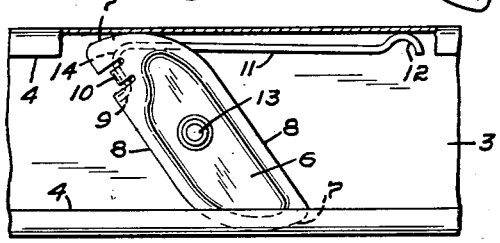
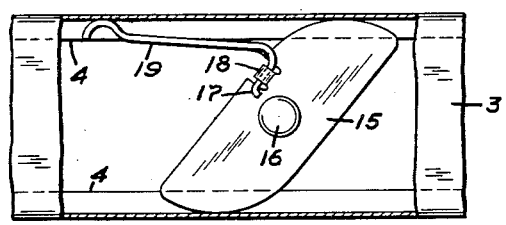
Inventor:
Arnold O. Jansson,
by Walter P. Jones
Atty.

United States Patent Office 3,151,716  
Patented Oct. 6, 1964

3,151,716  
MOLDING FASTENER  
Arnold O. Jansson, Arlington, Mass., assignor to United-Carr Incorporated, a corporation of Delaware  
Filed Feb. 5, 1962, Ser. No. 171,137  
2 Claims. (Cl. 189—88)

This invention is directed to a molding fastener assembly as a combination of elements and also a molding fastener per se.

The particular fastener member and combination of elements, including a molding fastening means and support, is generally shown in United States patent to W. A. Bedford, Jr., No. 2,709,286, issued May 31, 1955. The particular fastener shown in that patent has been widely used commercially in the automotive field for holding decorative moldings in the construction of the motor vehicle body. It has been found that that particular construction of molding fastener is not easily assembled in the molding by a one hand operation and furthermore, after assembly, it cannot be adjusted lengthwise of the molding as easily as is desired. Therefore, the present invention is directed to a new fastener construction assembly and a new combination. The fastener is easily assembled in the molding by a simple one hand operation and the construction and relation of the spring finger and the plate to the molding are such that the fastener may be easily and smoothly adjusted lengthwise of the molding.

An object of the invention is to provide an improved molding fastener with a spring finger arranged with relation to the elongated plate portion that the operation is a simple one hand operation of inserting an end of the plate and spring beneath a flange of the molding and then rotating and inserting the other end of the attaching plate beneath the other flange. As a result there is a new combination relationship between the attaching plate of the fastener, the spring finger and the molding.

In the drawings, which illustrate preferred embodiments of the invention,

FIG. 1 is a plan view of a portion of a molding installation with a fastener in dotted position;

FIG. 2 is an enlarged section taken on line 2—2 of FIG. 1;

FIG. 3 is a plan view of one form of the fastener to be attached to the molding;

FIG. 4 is an edge view of the fastener, shown in FIG. 3, as viewed from the edge where the spring finger is attached;

FIG. 5 is a bottom view with one of the flanges of the molding broken away to show the first step in assembly of the fastener with the molding;

FIG. 6 is a view similar to FIG. 5 showing the final assembly of the fastener with the molding;

FIG. 7 is a top plan view of a modified form of molding fastener device particularly with respect to the location of attachment of the spring finger to the elongated plate; and FIG. 8 is a plan view, partly in section, of a molding and the fastener, shown in FIG. 7, in assembly therewith.

In the molding fastener construction shown in FIGS. 1 through 6 and the installation thereof, there is included a support 1 having an aperture 2, a hollow molding 3 having inwardly turned flanges 4—4 and a fastening means which includes a molding engaging member and a nut member 5. The molding engaging member includes an elongated plate portion 6 having curved ends 7—7 and elongated side edges 8—8 as shown in FIG. 3. This elongated plate member carries a molding engaging spring finger having one end portion 9 attached to the plate portion 6 by means of an ear 10 formed from the plate portion 6 and bent around and securely anchoring the end portion 9 of the spring. The remaining portion 11 of the spring normally extends at substantially a right angle to the plate portion 6 (FIG. 3) and has a curved molding engaging portion 12 at its free end. A suitable fastening member, such as a screw member 13, is attached to the plate member 6 and extends normal thereto as best shown in FIG. 2.

In the particular arrangement of the parts of the molding engaging fastener shown in this first form of the invention, the spring finger is preferably attached to the elongated plate portion 6 adjacent to one end and at one of the elongated sides 8, and then extends across the plate so that the molding engaging portion 12 is beyond the opposite side of the plate 6.

In assembling the parts of the installation, the molding engaging fastener is first aligned with the molding from the underside (FIG. 5) with one end portion 7 thereof, and the spring finger, inserted under one of the flanges 4 so that the parts will appear as best shown in FIG. 5. Then the device is pressed and paritally rotated at the same time until the other end 7 may be snapped under the other flange portion 4 into the position shown in FIG. 6. It will be apparent to anyone skilled in the art that this operation may be easily and simply accomplished by a one-hand motion of inserting, twisting and snapping under the flanges 4—4 because the action takes place against the spring arm and the spring bends at a hinge portion 14. This action might be termed as bending with the hinge portion as compared to the action which takes place in the device shown in Patent No. 2,709,286, supra, in which the bending is against the action of the hinge portion. Thus, with the present device the length of the spring finger, in the arrangement with relation to the molding and the elongated plate, provides for an easier action and smoother operation. Furthermore, when the fastener is attached in the molding the engagement of the spring with the molding, which maintains the elongated plate 6 in attached position, provides for an easier and smoother longitudinal adjustment of the fastener relative to the molding.

After the molding engaging part of the fastening means is attached to the molding, the shank of the screw 13 is passed through the aperture 2 in the support 1 and the nut 5 is then threaded onto the screw to complete the installation.

The fastener shown in FIGS. 7 and 8 is disclosed to illustrate the fact that the same results, as far as insertion and of adjustability of the fastener relative to the molding, may be accomplished when the spring finger is attached to the same side of the elongated plate as the side beyond which the spring projects. In this case a similar elongated plate 15 is illustrated together with a screw 16. One end portion 17 of the spring is attached to the plate adjacent to an edge by an ear 18 but instead of the spring crossing over the plate as in FIG. 3 the remaining portion 19 extends directly away from the plate as clearly shown in FIG. 7.

In FIG. 8 it is clearly demonstrated that the fastener is attached in the same general manner as described in connection with the first form of the fastener and the action of the spring is the same during attachment as well as after attachment with respect to permitting adjustment of the finger lengthwise in a molding.

While the fastening means illustrated and described includes a screw member 13 and nut 5 it should be understood that this arrangement has nothing to do with the invention, and that a snap fastener stud, or any other suitable fastening means, may be used in place of the nut and screw.

While there have been illustrated and described two embodiments of the invention it should be understood that the patentable features illustrated and described are best defined by the following claims.

I claim:

1. A molding fastener for attaching a hollow molding to a support, said fastener having an elongated plate portion, including an ear, for spanning the distance between inturned edges of a hollow molding, an attaching fastener member associated with said plate portion, and a spring finger having a bend adjacent said ear acting as a hinge and having one end anchored to said plate portion by said ear adjustment one edge of said plate portion and extending across a surface of said plate portion and thence continuing, unidirectionally in a plane substantially perpendicular to said plate portion, to its termination.

2. A molding fastener assembly comprising, in combination, a support, a hollow molding with inturned edges and a fastener means attaching said molding to said support, said fastener means including an attaching fastener member associated with an elongated plate portion, said elongated plate portion engaging the inturned flanges of the molding and lying at an angle to the direction of said flanges and a spring finger attached to said plate portion, by an ear, adjacent an edge thereof and having an angular bend acting as a hinge adjacent to where the spring finger is attached to the plate and the remainder of said spring finger extending across said plate unidirectionally in a plane substantially perpendicular to said plate and engaging one of the inturned flanges of the molding, said spring finger being so oriented with respect to the plate and the inturned flange it engages that said plate and said flange continually cooperate to wind up said spring finger and decrease the angle of bend acting as a hinge and said spring finger engaging the inturned flange which is closer to the ear than to said attaching member.

References Cited in the file of this patent

UNITED STATES PATENTS

| | | |
|---|---|---|
| 2,709,286 | Bedford | May 31, 1955 |
| 2,910,750 | Scott | Nov. 3, 1959 |
| 3,011,234 | Fiddler | Dec. 5, 1961 |
| 3,034,615 | Kern | May 15, 1962 |
| 3,077,019 | Cochran | Feb. 12, 1963 |

UNITED STATES PATENT OFFICE
CERTIFICATE OF CORRECTION

Patent No. 3,151,716                          October 6, 1964

Arnold O. Jansson

It is hereby certified that error appears in the above numbered patent requiring correction and that the said Letters Patent should read as corrected below.

Column 3, line 11, for "adjustment" read -- adjacent --.

Signed and sealed this 13th day of April 1965.

(SEAL)
Attest:

ERNEST W. SWIDER                              EDWARD J. BRENNER
Attesting Officer                                    Commissioner of Patents